United States Patent [19]

Klabunde

[11] 3,851,396

[45] Dec. 3, 1974

[54] MEASURING GAGE FOR TURNING MACHINES AND THE LIKE

[75] Inventor: Steven Eldor Klabunde, Fond Du Lac, Wis.

[73] Assignee: Giddings & Lewis, Inc., Fond du Lac, Wis.

[22] Filed: June 1, 1973

[21] Appl. No.: 365,961

[52] U.S. Cl. .......... 33/143 L, 33/143 R, 33/147 N, 33/147 E, 33/178 D
[51] Int. Cl. ......................... G01b 5/08, G01b 5/10
[58] Field of Search .......... 33/147 E, 147 L, 147 N, 33/147 R, 143 L, 143 R, 174 Q, 174 M, 178 D

[56] References Cited
UNITED STATES PATENTS

| | | | |
|---|---|---|---|
| 2,807,091 | 9/1957 | Michelson | 33/180 R |
| 3,414,978 | 12/1968 | Prow | 33/143 R |
| 3,750,294 | 8/1973 | Belke et al. | 33/147 L |
| 3,755,909 | 9/1973 | Asano et al. | 33/147 N |
| 3,781,997 | 1/1974 | Pagella et al. | 33/147 E |

FOREIGN PATENTS OR APPLICATIONS

| 345,638 | 12/1921 | Germany | 33/147 E |
|---|---|---|---|

Primary Examiner—Harry N. Haroian
Assistant Examiner—Richard R. Stearns
Attorney, Agent, or Firm—Wolfe, Hubbard, Leydig, Voit & Osann, Ltd.

[57] ABSTRACT

An in-process measuring gage for use in connection with turning machines and the like wherein the gage is self-contained and adjusting for producing a precision output signal indicative of workpiece size. The gage has a column and a pair of arms attached to slides with the arms being normally biased and gravity actuated toward each other for maintaining continuous contact with a workpiece regardless of whether or not the workpiece is round. The arms while fixedly held in an outwardly projecting position include means for swinging transversely to an out of the way position in the event the arms encounter excessive resistance or an obstruction. The arms may be set in a predetermined position with clamping means and an arrangement is provided for permitting a certain amount of float by the arms so that they may move longitudinally to prevent damage should the arms be brought into contact with an oversized workpiece when they are clamped in the fixed position.

6 Claims, 5 Drawing Figures

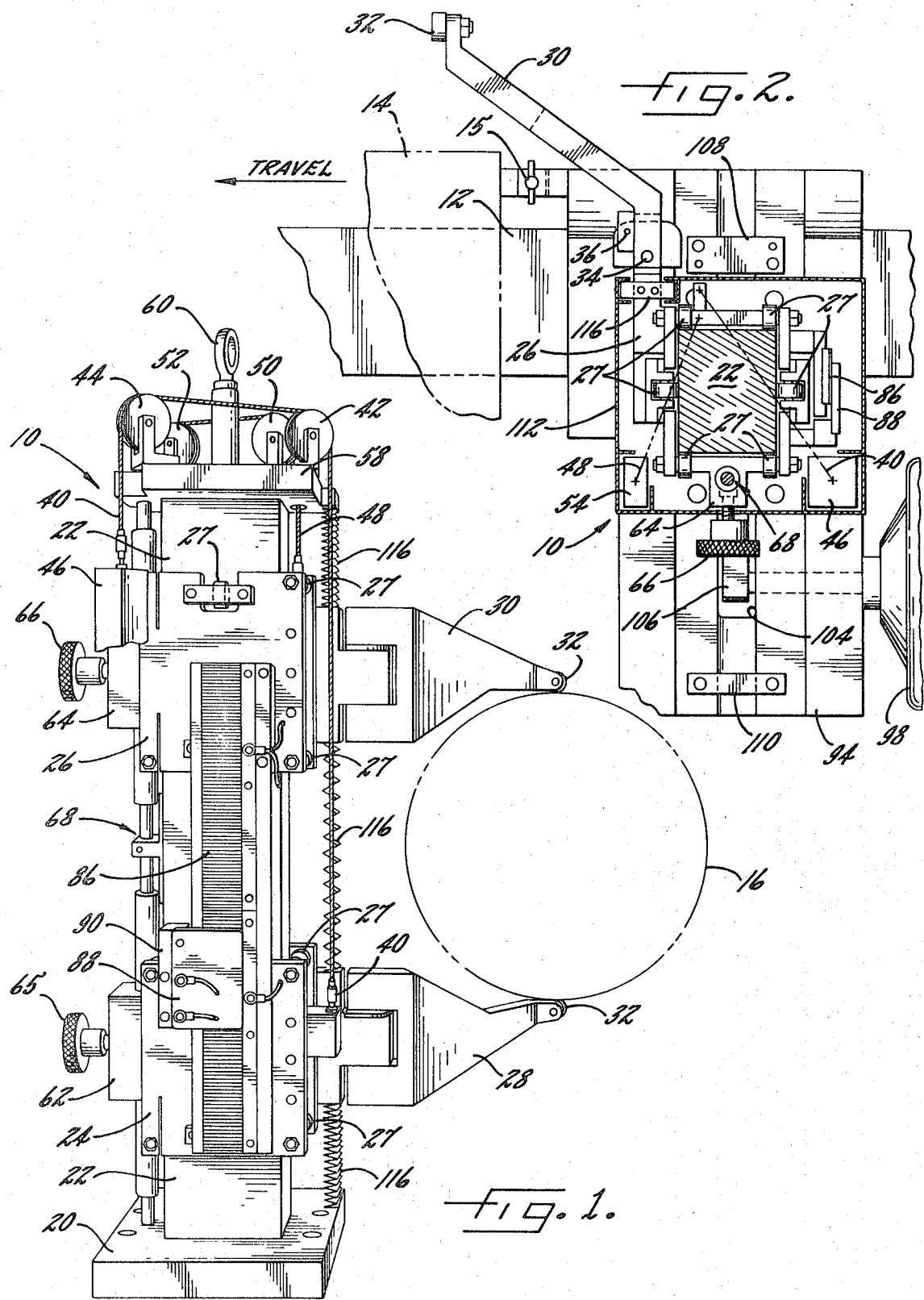

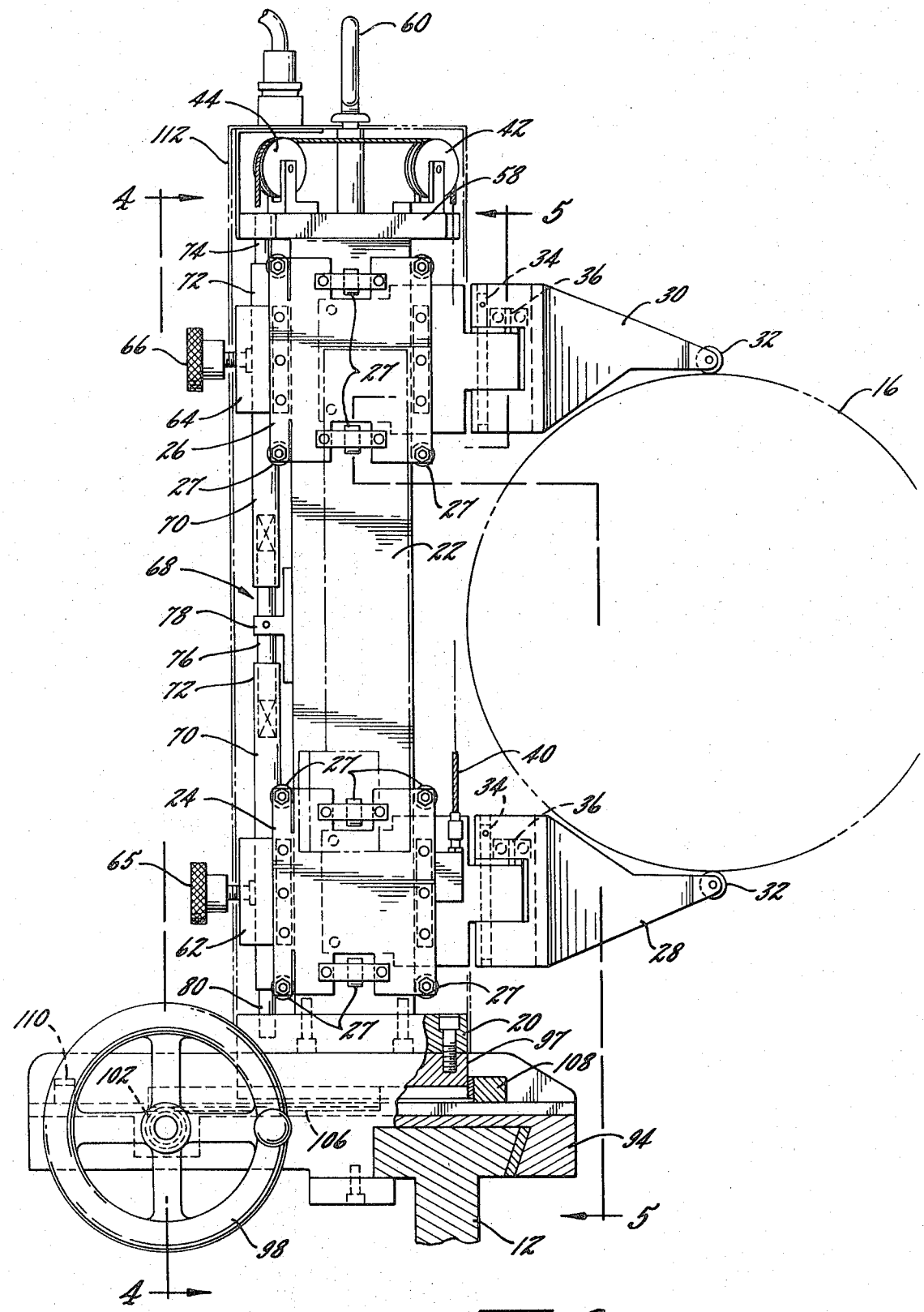

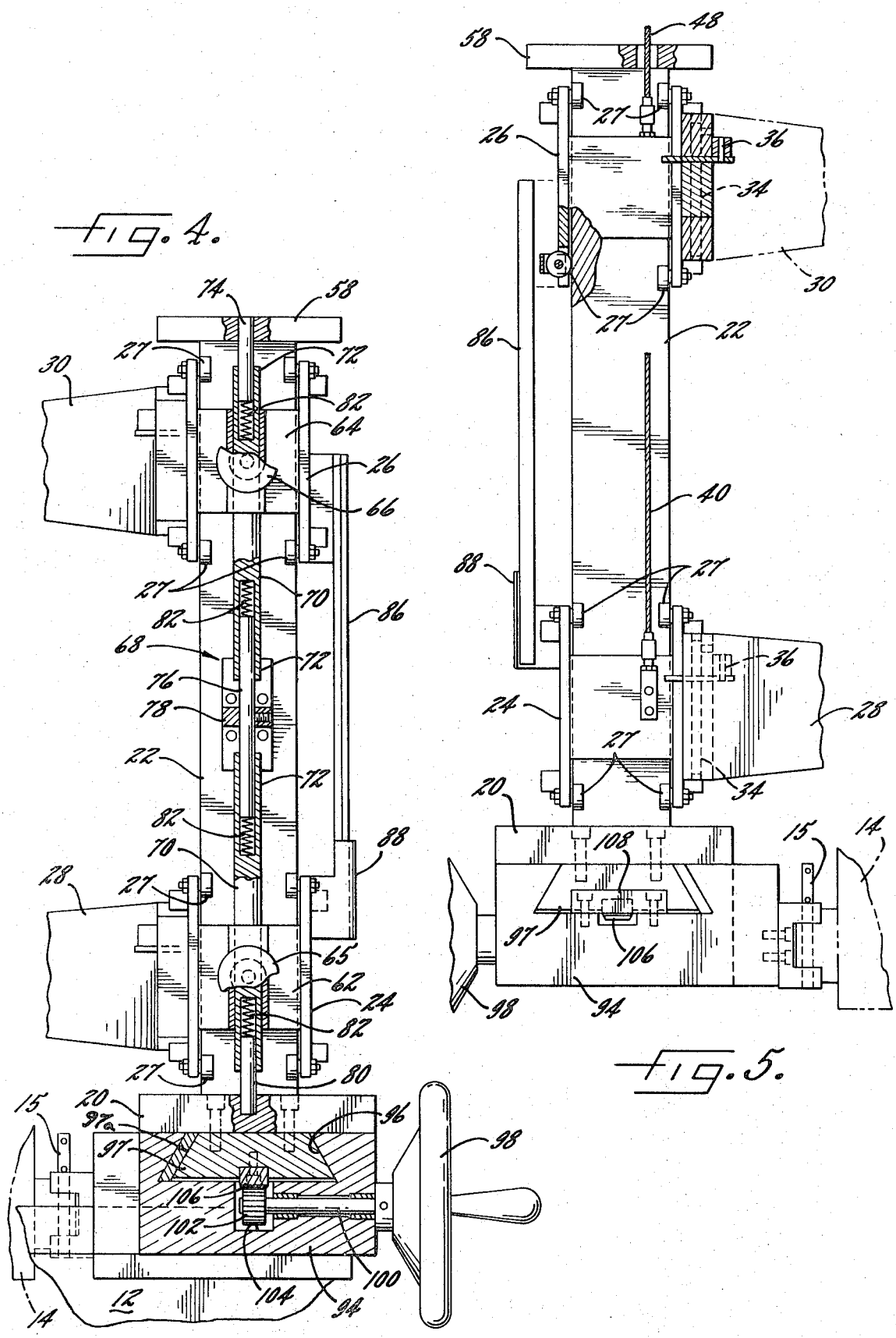

MEASURING GAGE FOR TURNING MACHINES AND THE LIKE

BACKGROUND OF THE INVENTION

The present invention relates generally to machine tool in-process measuring gages and more particularly, to an improved measuring gage for turning machines and the like that accurately measures and maintains a check on a workpiece as a machining operation is being performed, and where the gage is self-adjusting for relative changes in workpiece size for continuous operation throughout a wide range of workpiece sizes. In its principal aspect, the present invention is concerned with an improved self-contained and adjusting in-process measuring gage which is particularly suitable for use in connection with turning operations on contouring lathes and the like.

In machine tool operations where metal has been removed from a workpiece, such as for example in turning operations performed with contouring lathes, it is necessary to at least periodically measure the workpiece and make adjustments or corrections to the cutting tool as may be required to conform with specifications. With the increased wide-spread use of automatically controlled machine tools such as those operating under numerical control, automatic in-process measurement on a substantially continuous basis enhances the reliability of the machine tool production and quality control of workpieces formed. Various different arrangements have been proposed and are available, but for one reason or another they do not provide a high degree of flexibility with a minimum of mechanical and electrical control complexities rendering them adaptable to different size workpieces with virtually no readjustments or resettings being required.

Accordingly, it is a primary aim of the present invention to provide an improved in-process machine tool measuring gage which is relatively simple in construction and operation, but provides a high degree of flexibility for precision in-process measuring of workpieces. While not so limited in its application, the invention will find especially advantageous use where turning operations are performed with contour lathes on elongated or tubular workpieces.

It is another object of the invention to provide an in-process measuring gage which will provide a sensing output continuously throughout the range of the gage. In this connection it is an object to provide a gage of the foregoing type which does not require changing scales or recalibration to operate with workpieces throughout its range.

It is yet another object of the invention to provide an in-process measuring gage which utilizes a standard precision inductive coupling device for producing the output sensed by the gage.

Yet another object of the invention is to provide an improved in-process measuring gage which is capable of measuring out of roundness conditions as well as single diameter workpieces and is also capable of operating on tapers.

A further object of the invention is to provide a relatively simple, reliable measuring gage which is particularly susceptible of installation on a machine and wherein the gage measuring arms include provision for avoiding damage or accident when encountering excessive resistance. In this connection it is an object to provide a measuring gage having arms which are simple and accurate in motion for precision measuring. In one of its detailed aspects, it is an object to provide measuring gage arms which can be fixed at a given diameter while including a provision for yielding to avoid a forcing of the arms apart if the workpiece encounter is larger than the fixed setting.

It is still another object of the present invention to provide an improved in-process measuring gage which is entirely shielded and protected from exposure to chips, coolant and other contaminants, yet which is easily accessible for access to the inner workings of the gage.

Other objects and advantages will become apparent as the following description proceeds, taken together with the accompanying drawings.

DESCRIPTION OF THE DRAWINGS

FIG. 1 is a perspective view of an in-process measuring gage with the cover removed and portions broken away illustrative of the present invention, here showing a workpiece in phantom line;

FIG. 2 is a top plan view of the in-process measuring gage of the present invention here shown in relation to its mounting on a machine tool fragmentarily illustrated in schematic;

FIG. 3 is an enlarged side view of the measuring gage with the cover part removed and portions being indicated in section;

FIG. 4 is a view taken along the line 4—4 in FIG. 3;

FIG. 5 is a view taken substantially along the line 5—5 in FIG. 3.

While the invention is susceptible of various modifications and alternative constructions, an illustrative embodiment has been shown in the drawings and will be described below in considerable detail. It should be understood, however, that there is no intention to limit the invention to the specific form disclosed but, on the contrary, the intention is to cover all modifications, alternative constructions and equivalents falling within the spirit and scope of the invention.

DESCRIPTION OF PREFERRED EMBODIMENT

Referring to the drawings, there is shown in FIG. 1, an illustrative in-process measuring gage in accordance with the present invention which is self-contained and adapted to be easily mounted on a turning machine tool or the like.

The measuring gage, generally indicated at 10, may be mounted, as illustrated in FIG. 2, to ride along the guideway 12 on which the turning machine carriage 14 travels. A pin coupling 15 connects the gage 10 to the turning machine carriage 14 so that the gage is towed along with the carriage for movement along and parallel to the workpiece 16 (FIG. 1).

As viewed in FIG. 1, the gage includes a horizontal base 20 and an upstanding central column 22 rigidly secured thereto. The column 22 supports a pair of slides 24, 26 for vertical movement along the column and for the purpose of providing easy movement of the slides along the column, rollers 27 are positioned on each side of the slides. Each of the slides 24, 26 carries an arm 28, 30 respectively with the arms having rollers 32 for contacting the outer peripheral surface of the workpiece 16.

In accordance with one of the aspects of the invention each arm is hingedly connected to its respective slide by a hinge pin arrangement 34 (FIGS. 2 and 3). In order to prevent the arms from swinging in the horizontal plane, a detent or shear means such as a shear pin 36 (FIG. 3) is provided so that the arms are normally locked in a rigid, fixed position. Thus, should either of the arms 28, 30 encounter an obstruction or excessive resistance in the horizontal direction as the measuring gage 10 is towed behind the tool carriage 14, the shear pin 36 will be severed permitting the arm to swing freely in the horizontal plane which will avoid an injury or damage to any of the gage components.

In accordance with another aspect of the present invention, the arms 28, 30 and their respective supporting slides 24, 26 are self-adjusting by being normally biased toward each other in the vertical direction. To this end, the lower slide 24 is connected via a cable 40 extending up and over a pair of sheeves 42, 44 and the opposite end of the cable 40 is attached to a hanging counterweight 46. The mass of the weight 46 is such that it tends to pull the slide 24 and arm 28 upwardly.

Similarly, a cable 48 attached to slide 26 extends upwardly and over a pair of sheeves 50, 52 and the opposite end of cable 48 is attached to a freely suspended counterweight 54 (FIG. 2). The mass of the counterweight 54 is considerably less than that of the counterweight 46 and is selected such that the slide 26 and arm 30 tend to be biased downwardly.

The sheaves 42, 44 and 50, 52 are mounted to a horizontal plate 58 connected to the top of vertical column 22. There is also provided an eye hook member 60 for lifting the gage assembly 10 and transporting it to or from the machine tool with which it is to be used.

In accordance with still another aspect of the present invention, provision is made to set the arms 28, 30 and their respective slides 24, 26 in preset positions, but with means for permitting limited vertical movement of the arms to prevent damage to the gage assembly in the event that the arms are moved into contact with a workpiece having a diameter larger than that to which the arms are set. To this end, as best illustrated in FIGS. 3 and 4 each of the slides 24, 26 carries a clamp 62, 64 having clamp screws 65, 66. The clamp screws act upon a clamp rod assembly generally indicated at 68. The clamp rod assembly is made up of a pair of rods 70 having sleeve-like ends 72. The upper rod 70 receives a pin 74 projecting downwardly from the plate 58 and the opposite sleeve end receives a pin 76 carried by a bracket 78 mounted to column 22. The pin 76 also projects into sleeve end 72 of the lower rod 70 and likewise, a pin 80 projecting upwardly from base 22 is received by the opposite end of lower rod 70. Springs 82 are disposed in each of the sleeves so that the rods 70 may float with a limited amount of vertical movement being permissible by the rods between their respective supporting pins 74, 76 and 80.

The arrangement is such that tightening clamp screws 65 and 66 against the rod 70 fixes the position of the slides 24, 26 along the column 22, but the slides and consequently the arms may move along with the rod 70 by the limited amount of float accorded by the springs either up or down in the vertical direction. When the clamp screws 65 and 66 are released the slides and arms may move freely up or down in the vertical direction along the column 22.

In carrying out the present invention, provision is made for production of an output signal based upon the relative distance between the rollers 32 of arms 28 and 30, as well as any change in their relative distance to measure the workpiece 16 disposed between the arms. To this end, referring to FIG. 1, an inductive coupling measuring system of the linear scale 86 and vernier slider 88 (i.e. Inductosyn, a product of Farrand Controls, Inc.) is utilized in conjunction with the slides 24, 26 to measure relative movement between the slides. In the present instance, the scale 86 is attached to the upper slide 26 and projects downwardly parallel with the column 22 overlaying the lower slide 24. The vernier slider 88 is attached to the lower slide 24 by a bracket 90 so that it overlays the scale 86. Thus, an inductive coupling between the windings of the scale and vernier slider produces a signal which is transmitted to electrical circuitry to a suitable control (not shown) that either translates the signal into the desired usable indication of the workpiece diameter or directly couples the output to the machine tool control for automatic compensation or adjustment of the cutting tool.

For the purpose of positioning the gage 10 in the operative position with respect to the workpiece or for retracting it to an out of the way position, a saddle 94 (FIGS. 2, 3 and 4) to which the base 20 of the gage mounts is slidably attached to the way 12 for movement along the way. The saddle projects perpendicularly out from the way 12 and has a dovetail way seat 96 (FIG. 4) longitudinally formed in the upper surface of the saddle. A complimentary way 97 formed on the underside of the gage base 20 is received by the way seat 96. Adjustable gib 97a serves to establish a close sliding fit between the ways.

In order to position the gage along the saddle 94, there is provided a hand crank 98 rotatably supported on the saddle by a shaft 100 having a pinion gear 102 at its inboard end disposed in a slot 104 located beneath the dovetail slot 96 of the saddle. The pinion 102 engages a rack 106 secured to the underside of way 97 so that rotation of the crank 98 moves the gage 10 longitudinally along the saddle 94.

In order to establish the forward position of the gage, a fixed stop 108 (FIG. 2) is attached to the saddle and disposed in a predetermined position so that movement of the gage forward by rotation of the hand crank 98 until the gage abuts the stop 108 results in the arms 28, 30 being positively centered with respect to the workpiece 16.

A rear stop 110 fixed to the saddle serves to establish the rearmost inoperative position of the gage of the saddle 94.

In order to protect the gage components from exposure to chips, coolant and other contaminants, a housing 112 (FIGS. 2 and 3) slides into place over the top of the column 22 and encases the entire gage assembly. A suitable slot in the housing permits free travel of the projecting arms 28, 30 and as shown in FIG. 1 pleated guards 116 are provided to close the slot opening without restricting the movement of the arms.

To better understand the operation of the present in-process measuring gage a brief description will be presented taken in conjunction with drawing FIGS. 1, 2 and 3. When starting up, the measuring gage 10 base 20 is normally mounted to the saddle 94 which in turn is towable along the way 12 with the machine cutting tool carriage 14. With the gage retracted on the saddle at the inoperative position against rear stop 110 an operator would set the slides 24, 26 at a predetermined spaced apart startup setting by tightening clamp screws 65, 66 to clamp rod assembly 68.

At this stage, hand crank 98 is rotated to advance the gage forwardly until the base 20 abuts forward stop 108 placing the gage in its operative position. The arms 28, 30 will span the workpiece 16, but even if the operator has not allowed sufficient distance for the arms to clear the workpiece the permissible float in the clamp rod assembly will allow the arms to be spread by the engagement with the workpiece. Loosening the clamp screws 65, 66 then places the slides and arms in their self-adjusting state wherein the arms are gravity actuated and biased toward one another so that the rollers 32 engage the outer peripheral surface of the workpiece 16.

It will be appreciated that the rollers permit smooth rolling contact as the workpiece rotates for the machining operation as well as sliding contact longitudinally as the gage is towed behind the tool carriage 14. The arms are completely self-adjusting in that they can be spread apart and then moved together if the workpiece is out of round such as elliptical or oblong in cross section. Also, the arms will maintain the same continuous contact if the workpiece includes a taper along its longitudinal surface. Should the arms encounter an obstruction or an abutment that they are unable to ride over, the shear pin 36 will be severed and the arms will swing transversely out of the way.

The inductive coupling device produces an accurate and precision output signal indicative of any change in relative distance between the slides throughout the entire range of the gage and without any need for changing scales or recalibration. For example, tests conducted have shown that an accuracy of less than ±.001 inches over a 12 inch range in diameters i.e. 8 inch to 20 inch diameter workpieces, can be obtained with a commercially produced gage not having extremely accurate machining tolerances on the parts. On the other hand, the gage itself can be produced with precision parts for obtaining a measuring accuracy of about ±.0003 inches.

I claim as my invention:

1. An in-process measuring gage for use with a turning machine or the like, comprising in combination, a base, a column extending outwardly from said base, a pair of arms slidably carried by said column, said arms having ends projecting outwardly substantially perpendicular to the column, contact means at the outer ends of each of said arms for engaging a rotating workpiece between said arms, means for normally biasing said arm means toward one another for maintaining continuous engagement with a workpiece disposed between said arms by said contact means, signal generating means connected to said arms for producing an output indicative of the relative spaced apart position of said arms and any changes in relative spaced apart position of said arms, each of said arms including a clamp member and means fixed with respect to said column for engagement by said clamp members so that said arms may be set in predetermined positions spaced apart from one another, and said fixed means includes means for imparting a limited amount of float so that when said arms are clamped to said fixing means the arms are free to move by said limited amount of float.

2. A gage as claimed in claim 1 wherein each of said arms includes a slide disposed about said column and an arm member hingedly supported by said slide so that said arms may swing transversely with respect to said slides and shear means fixedly holding said arms in outwardly projecting positions normally preventing such transverse swinging.

3. A gage as claimed in claim 1 wherein said biasing means comprises freely suspended counterweights connected to respective ones of said arms by cables so that said arms are gravity actuated toward one another.

4. A gage as claimed in claim 1 including mounting means for adjustably mounting said base to said machine, said mounting means having a longitudinally extending sliding connection with said base and means for shifting said base longitudinally along said mounting means.

5. A gage as claimed in claim 4 wherein said mounting means includes a pair of stops disposed at opposite ends thereof for limiting the forward and rearward end movement of the base with respect to said mounting means.

6. A gage as claimed in claim 1 wherein said contact means at the outer ends of each of said arms comprises a roller.

* * * * *